United States Patent
Glaeser et al.

(10) Patent No.: US 12,534,104 B2
(45) Date of Patent: Jan. 27, 2026

(54) METHOD AND CONTROL DEVICE FOR TRAINING AN OBJECT DETECTOR

(71) Applicant: Robert Bosch GmbH, Stuttgart (DE)

(72) Inventors: Claudius Glaeser, Ditzingen (DE); Fabian Timm, Renningen (DE); Florian Drews, Renningen (DE); Michael Ulrich, Stuttgart (DE); Florian Faion, Staufen (DE); Lars Rosenbaum, Lahntal (DE)

(73) Assignee: Robert Bosch GmbH, Stuttgart (DE)

( * ) Notice: Subject to any disclaimer, the term of this patent is extended or adjusted under 35 U.S.C. 154(b) by 273 days.

(21) Appl. No.: 18/157,544

(22) Filed: Jan. 20, 2023

(65) Prior Publication Data
US 2023/0234610 A1 Jul. 27, 2023

(30) Foreign Application Priority Data
Jan. 24, 2022 (DE) .................... 10 2022 200 735.2

(51) Int. Cl.
| | |
|---|---|
| *B60W 60/00* | (2020.01) |
| *B60W 50/06* | (2006.01) |
| *G06V 10/75* | (2022.01) |
| *G06V 10/82* | (2022.01) |
| *G06V 20/58* | (2022.01) |

(52) U.S. Cl.
CPC .......... *B60W 60/001* (2020.02); *B60W 50/06* (2013.01); *G06V 10/751* (2022.01); *G06V 10/82* (2022.01); *G06V 20/58* (2022.01); *B60W 2420/00* (2013.01)

(58) Field of Classification Search
None
See application file for complete search history.

(56) References Cited

U.S. PATENT DOCUMENTS

| | | | |
|---|---|---|---|
| 2020/0057442 A1* | 2/2020 | Deiters | G06V 20/58 |
| 2021/0117696 A1* | 4/2021 | Hertlein | G06F 18/25 |
| 2021/0232833 A1* | 7/2021 | Nguyen | G06V 20/58 |
| 2021/0255300 A1* | 8/2021 | Harrison | G01S 13/931 |
| 2022/0007137 A1* | 1/2022 | Choi | G06N 3/088 |
| 2022/0383146 A1* | 12/2022 | Schoeler | G06V 10/82 |
| 2022/0383648 A1* | 12/2022 | Vineet | G06V 10/776 |
| 2023/0419649 A1* | 12/2023 | Glaeser | G06V 10/80 |
| 2024/0104350 A1* | 3/2024 | Bachrach | G06N 3/047 |

FOREIGN PATENT DOCUMENTS

| | | |
|---|---|---|
| DE | 102017006155 A1 * | 12/2017 |
| DE | 10 2020 200 911 B3 | 10/2020 |
| DE | 10 2019 215 903 A1 | 4/2021 |

OTHER PUBLICATIONS

Machine Translation of DE102017006155 (Year: 2024).*

* cited by examiner

*Primary Examiner* — Aniss Chad
*Assistant Examiner* — Jennifer M Anda
(74) *Attorney, Agent, or Firm* — Maginot, Moore & Beck LLP

(57) ABSTRACT

A method is for training an object detector configured to detect objects in sensor data of a sensor. The method includes providing first sensor data of the sensor, providing an object representation assigned to the first sensor data, and transmitting the object representation to a sensor model. The method further includes imaging object representations onto the first sensor data of the sensor with the sensor model, assigning the object representation to second sensor data with the sensor model, and training the object detector based on the second sensor data.

10 Claims, 3 Drawing Sheets

METHOD AND CONTROL DEVICE FOR TRAINING AN OBJECT DETECTOR

This application claims priority under 35 U.S.C. § 119 to patent application no. DE 10 2022 200 735.2, filed on Jan. 24, 2022 in Germany, the disclosure of which is incorporated herein by reference in its entirety.

The disclosure relates to a method and a control device for training an object detector by means of which an optimized object detector can be produced.

BACKGROUND

Comprehensive recognition of the surroundings of a motor vehicle and in particular of objects, for example other road users in the surroundings of the motor vehicle, forms the basis for many driver assistance systems and automated driving functions of the motor vehicle. Here, motor vehicles usually have sensor systems which have the task of detecting objects within their particular detection range. The individual sensor systems each comprise an environment sensor and a processing unit which is designed to analyze data supplied by the environment sensor, for example in order to detect objects in the data. The environment sensors may be, for example, cameras, radars, LIDARs or ultrasonic sensors.

Such sensor systems or the processing units of the sensor systems are increasingly based on machine learning algorithms, for example deep neural networks. A deep neural network for object detection typically consists of two modules. A first module, the so-called feature backbone, is used for feature extraction on the basis of sensor data, features being extracted from the sensor data by concatenating a plurality of neural network layers. A second module, the so-called detection head, then performs object detection for one or more object classes on the basis of the extracted features.

Such object detectors are usually trained by means of supervised learning, that is to say on the basis of annotated data or labeled data. However, the creation and, in particular, the annotation of corresponding data records is very time- and resource-intensive or cost-intensive. In particular, the data records in this case have annotations only for such objects which are suitably measured by the corresponding sensors. In addition, sensors are known for which there are typically no annotations, for example radar sensors. Since objects can be annotated only very poorly on the basis of radar-based object detectors, LIDAR-based annotations are frequently used to train a radar-based object detector. Due to different measuring principles, sensor specifications or installation positions of the different sensors, however, the annotations frequently cannot be transmitted one-to-one, which can lead to a reduced quality of the correspondingly trained object detector.

DE 10 2017 006 155 A1 discloses a method for operating a sensor system having at least two environment sensors for a vehicle, a first classifier being trained with first training data of a first environment sensor, a first classification model representing the first classifier being determined, first sensor data of the first environment sensor being classified on the basis of the first classification model, second sensor data of a second environment sensor different from the first environment sensor being received, the second sensor data being classified by means of the first classifier on the basis of the first classification model, the classified second sensor data being transmitted as second training data to a second classifier which is assigned to the second environment sensor, and a second classification model representing the second classifier being determined on the basis of the second training data.

The object of the disclosure is therefore to specify an improved method for training an object detector.

This object is achieved by a method for training an object detector according to the features disclosed herein. The object is also achieved by means of a control device for training an object detector according to the features disclosed herein.

SUMMARY

According to one embodiment of the disclosure, this object is achieved by a method for training an object detector, wherein the object detector is designed to detect objects in sensor data of a sensor, and wherein first sensor data of the sensor are provided, an object representation assigned to the first sensor data being provided, the object representation being transmitted to a sensor model which is designed to image object representations onto sensor data of the sensor, wherein the object representation is assigned to second sensor data by means of the sensor model, and wherein the object detector is trained on the basis of the second sensor data.

The sensor model thus describes a function which images an environment representation onto measurement data of the sensor that are to be expected for the environment representation. In particular, the sensor model models the measurement characteristic of the corresponding sensor.

Object detection by the object detector may further comprise both the classification of objects and the estimation of object parameters of the classified objects. Furthermore, object detection by the object detector may also comprise, for example, only the classification of objects. In this case, the object detector can be pretrained, for example, on the basis of known values or values actually measured by the sensor and corresponding associated detection or object detection results.

Object representation is also referred to as a representation or image of an object in sensor data. The object representation may be generated, for example, on the basis of the first sensor data by means of the object detector, that is to say it may be an object detection result, or it may also be specified by means of provided annotations or by additional data supplied, for example, by other sensors and used as a supplement.

The method makes it possible for data records which have been annotated on the basis of particular sensors to be used for another sensor. For example, annotations which have been generated on the basis of a lidar sensor can be used to train a radar object detector. This increases the reusability of existing data records and thus reduces the need for additional annotations, resulting in time and cost savings.

In addition, however, the method is also not dependent on the presence of annotations and can also be applied to unlabeled data. Consequently, a significantly larger data volume can be used to train the object detector, which has a further positive effect on the object detection quality or the quality of the object detector and the quality of the generated training data.

Overall, an improved method for training an object detector is thus specified.

The training of the object detector may be supervised or even unsupervised or only partially supervised learning.

The method may further comprise comparing the second sensor data with the first sensor data in order to determine a first cost function and training the object detector on the basis of the first cost function.

Cost function or loss is understood to mean a loss or an error between determined output values and corresponding actual conditions or actually measured data.

As a result of the first cost function generated by means of the modeling of the sensor model or the measurement characteristic of the sensor, the training of the object detector can thus be controlled in a targeted manner and said object detector can be retrained in a simple manner and with little resource consumption. For example, if the object detector is based on a deep neural network, the first cost function can be propagated back through the network layers and used to adapt the corresponding network weights.

In addition, the method may further comprise providing annotations, comparing the object representation with the annotations provided in order to determine a second cost function, and training the object detector on the basis of the second cost function, the object detection result being generated by the object detector on the basis of the first sensor data.

The object detector can be improved or refined by correspondingly retraining the object detector on the basis of the second cost function. For example, if the object detector is based on a deep neural network, the second cost function can again be propagated back through the network layers and used to adapt the corresponding network weights.

Furthermore, the object representation may be an annotation. In this case, the method may further comprise a step of estimating whether the annotation lies within a visible range of the sensor, the first sensor data being discarded if the annotation does not lie within the visible range of the sensor.

The visible range or field of view of the sensor is understood to mean a region within which events or changes can be perceived and recorded by the sensor.

The fact that the first sensor data are discarded further means that the pair consisting of first sensor data and the object representation or annotation does not constitute training data for training the object detector, or rather said pair is not used to train the object detector.

Existing annotations of non-visible, for example concealed, objects can thus be excluded from the training of the object detector for the sensor. This can in turn have a positive effect on the quality of the object detector.

The sensor model may be an artificial neural network.

Artificial neural networks are patterned after biological neurons and allow for the learning of an unknown system behavior from existing training data and subsequent application of the learned system behavior to unknown input variables. The neural network consists of layers with idealized neurons, which are connected to one another in different ways in accordance with a topology of the network. The first layer, which is also referred to as an input layer, detects and transmits the input values, the number of neurons in the input layer corresponding to the number of input signals which are to be processed. The last layer is also referred to as an output layer and has just as many neurons as output values to be provided. Between the input layer and the output layer there is also at least one intermediate layer, which is often also referred to as a hidden layer, the number of intermediate layers and the number of neurons in these layers being dependent on the specific problem to be solved by the neural network.

Because the sensor model is an artificial neural network, the modeling of the measurement characteristic of the first sensor can be optimized. In this case, the sensor model can be trained on the basis of known actual or measured sensor data of the sensor and associated object detection results generated by the object detector itself or provided annotations, it being possible to train the sensor model simultaneously with the object detector but also independently of the object detector.

The sensor model is an artificial neural network, but this is only a preferred embodiment. For example, the sensor model may also be generated on the basis of expert knowledge.

Another embodiment of the disclosure also specifies a method for controlling a driver assistance system of a motor vehicle, an object detector being provided for a sensor of the motor vehicle, which object detector has been trained by means of a method described above for training an object detector, object detection results being generated by the object detector for the sensor, and the driver assistance system being controlled on the basis of the object detection results.

The fact that object detection results are generated for the sensor of the motor vehicle means that object detection is carried out on data recorded by the sensor of the motor vehicle.

A method for controlling a driver assistance system of a motor vehicle is thus specified, which is based on an object detector which is trained on the basis of an improved method for training an object detector.

The method for training the object detector makes it possible for data records which have been annotated on the basis of particular sensors to be used for another sensor. For example, annotations which have been generated on the basis of a lidar sensor can be used to train a radar object detector. This increases the reusability of existing data records and thus reduces the need for additional annotations, resulting in time and cost savings.

Furthermore, however, the method for training the object detector is also not dependent on the presence of annotations and can also be applied to unlabeled data. Consequently, a significantly larger data volume can be used to train the object detector, which further positively affects the object detection quality or the quality of the object detector.

Another embodiment of the disclosure also specifies a control device for training an object detector, the object detector being designed to detect objects in sensor data of a sensor, and the control device comprising a first provision unit which is designed to provide first sensor data of the sensor; a second provision unit which is designed to provide an object representation assigned to the first sensor data; a transmission unit which is designed to transmit the object representation to a sensor model which is designed to image object representations onto sensor data of the sensor; an assignment unit which is designed to assign the object representation to second sensor data by means of the sensor model; and a training unit which is designed to train the object detector on the basis of the second sensor data.

An improved control device for training an object detector is thus specified.

The control device is designed such that it is possible for data records which have been annotated on the basis of particular sensors to be used for another sensor. For example, annotations which have been generated on the basis of a lidar sensor can be used to train a radar object detector. This increases the reusability of existing data records and thus reduces the need for additional annotations, resulting in time and cost savings.

Furthermore, however, the control device is also designed such that it is not dependent on the presence of annotations and can also be applied to unlabeled data. Consequently, a significantly larger data volume can be used to train the object detector, which further positively affects the object detection quality or the quality of the object detector.

The control device may further comprise a first comparison unit which is designed to compare the second sensor data with the first sensor data in order to determine a first cost function, the training unit being designed to train the object detector on the basis of the first cost function. The training of the object detector can thus be controlled in a more targeted manner by means of the first cost function generated by means of the modeling of the sensor model or the measurement characteristic of the sensor. For example, training can focus on the properties of an object which the sensor can measure very well, for example due to its installation position. As a result, the quality of the trained object detector can be significantly improved. For example, if the object detector is based on a deep neural network, the first cost function can be propagated back through the network layers and used to adapt the corresponding network weights.

In addition, the control device may further comprise a third provision unit which is designed to provide annotations. In this case, the control device may, for example, also comprise a second comparison unit which is designed to compare the object representation with the annotations provided in order to determine a second cost function, the training unit being designed to train the object detector on the basis of the second cost function, the second provision unit being designed to generate the object representation by means of the object detector on the basis of the first sensor data. The object detector can be improved or refined by correspondingly training the object detector on the basis of the second cost function. For example, if the object detector is based on a deep neural network, the second cost function can again be propagated back through the network layers and used to adapt the corresponding network weights.

Furthermore, the object representation may be a provided annotation. In this case, the control device may further also comprise an estimation unit which is designed to estimate whether the annotation lies within a visible range of the sensor, and a discarding unit which is designed to discard the first sensor data if the annotation does not lie within the visible range of the sensor. Existing annotations of non-visible, for example concealed, objects can thus be excluded from the training of the object detector. This can in turn have a positive effect on the quality of the trained object detector.

The sensor model may again be an artificial neural network.

Because the sensor model is an artificial neural network, the modeling of the measurement characteristic of the sensor can be optimized. In this case, the sensor model can be trained on the basis of known actual or measured sensor data of the sensor and associated object detection results generated by the object detector itself or provided annotations, it being possible to train the sensor model simultaneously with the object detector but also independently of the object detector.

The sensor model is an artificial neural network, but this is only a preferred embodiment. For example, the sensor model may also be generated on the basis of expert knowledge.

Another embodiment of the disclosure also specifies a control device for controlling a driver assistance system of a motor vehicle, the control device comprising a receiving unit for receiving an object detector for a sensor of the motor vehicle, said object detector being trained by means of a control device described above for training an object detector, a generation unit which is designed to generate object detection results by means of the object detector for the sensor of the motor vehicle, and a control unit which is designed to control the driver assistance system on the basis of the generated object detection results.

A control device for controlling a driver assistance system which is designed to control the driver assistance system on the basis of an object detector which has been trained by means of an improved control device for training an object detector is thus specified.

The control device for training an object detector is designed such that it is possible for data records which have been annotated on the basis of particular sensors to be used for another sensor. For example, annotations which have been generated on the basis of a lidar sensor can be used to train a radar object detector. This increases the reusability of existing data records and thus reduces the need for additional annotations, resulting in time and cost savings.

Furthermore, however, the control device for training an object detector is also designed such that it is not dependent on the presence of annotations and can also be applied to unlabeled data. Consequently, a significantly larger data volume can be used to train the object detector, which further positively affects the object detection quality or the quality of the object detector.

In summary, it should be noted that the disclosure specifies a method and a control device for training an object detector by means of which an optimized object detector can be produced.

The described embodiments and developments can be combined with one another as desired.

Further possible embodiments, developments and implementations of the disclosure also include combinations not explicitly mentioned of features of the disclosure described above or in the following relating to the exemplary embodiments.

BRIEF DESCRIPTION OF THE DRAWINGS

The accompanying drawings are intended to impart further understanding of the embodiments of the disclosure. They illustrate embodiments and, in connection with the description, serve to explain principles and concepts of the disclosure.

Other embodiments and many of the mentioned advantages are apparent from the drawings. The illustrated elements of the drawings are not necessarily shown to scale relative to one another. In the drawings.

DETAILED DESCRIPTION

In the figures of the drawings, identical reference signs denote identical or functionally identical elements, parts or components, unless stated otherwise.

Figure 1:
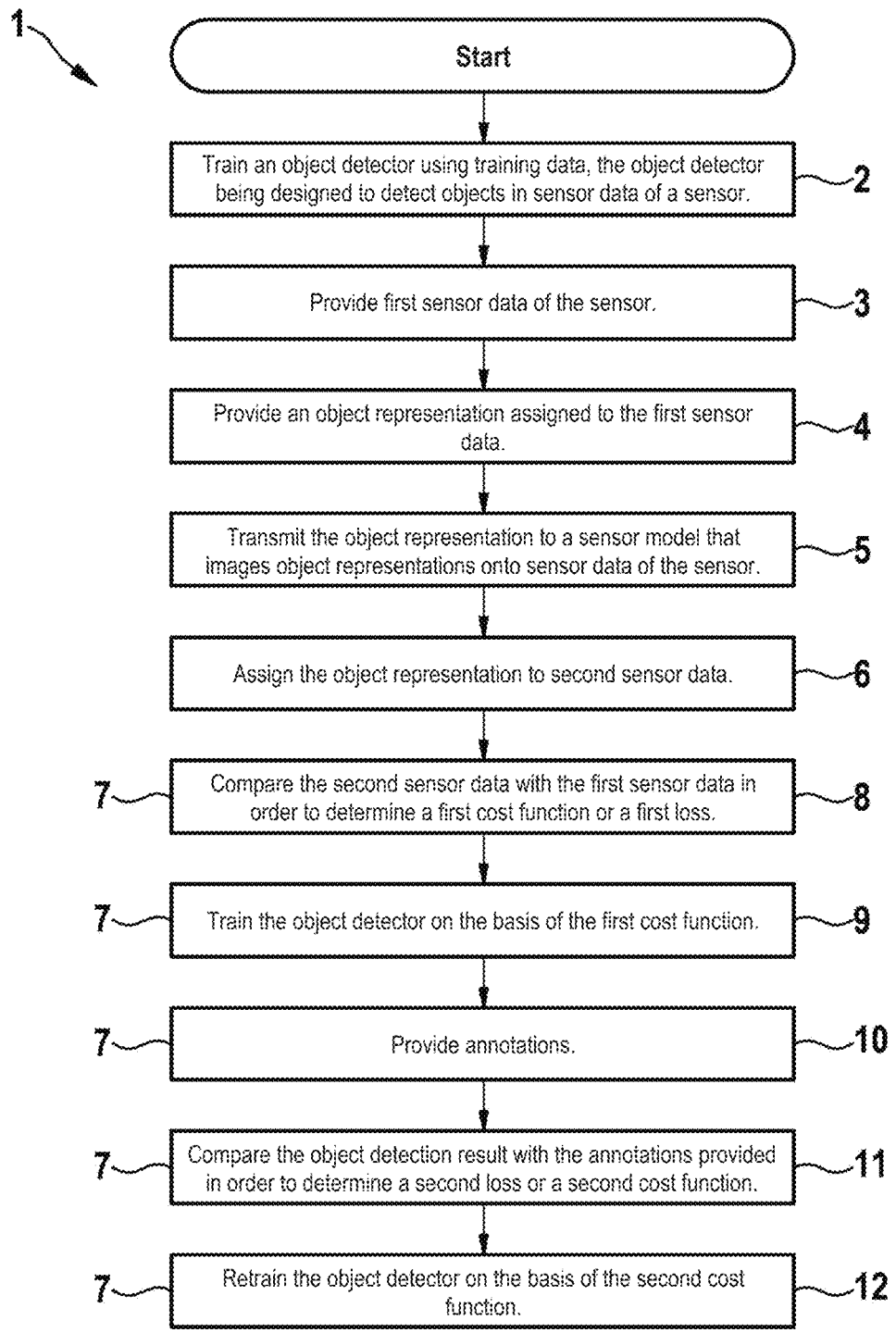
FIG. 1 is a flowchart of a method for training an object detector according to a first embodiment.

FIG. 1 is a flowchart of a method for training an object detector 1 according to a first embodiment.

The starting point is an object detector which detects objects for at least one object class on the basis of sensor data. The detection can include both a classification with regard to the type of object and a regression of the corresponding object parameters.

According to the first embodiment, the aim is to train such an object detector on the basis of sensor data of a sensor for which no annotations are typically present. An example of this is a radar sensor which provides reflections as measurement data. However, since objects can only be annotated with difficulty due to reflections, LIDAR-based annotations are frequently used to train a radar-based object detector.

However, due to different measuring principles, different sensor specifications or the different installation positions of the sensors, it is not possible for LIDAR-based annotations to be transmitted to a radar sensor one-to-one. For example, different ranges or fields of view can restrict the suitability of the annotations. Likewise, some annotated object properties cannot be measured using the measuring principle of the target sensor, for example a radar sensor. For this reason, LIDAR-based annotations typically include a height of the annotated object, whereas many radar sensors have only a limited elevation resolution.

FIG. 1 shows a method 1, which comprises a step 2 of training or pretraining an object detector using training data, the object detector being designed to detect objects in sensor data of a sensor, a step 3 of providing first sensor data of the sensor, a step 4 of providing an object representation assigned to the first sensor data, a step 5 of transmitting the object representation to a sensor model which is designed to image object representations onto sensor data of the sensor, a step 6 of assigning the object representation to second sensor data, and a step 7 of training the object detector on the basis of the second sensor data.

The illustrated method 1 makes it possible for data records which have been annotated on the basis of particular sensors to be used for another sensor. For example, annotations which have been generated on the basis of a lidar sensor can be used to train a radar object detector. This increases the reusability of existing data records and thus reduces the need for additional annotations, resulting in time and cost savings.

In addition, however, the illustrated method 1 is also not dependent on the presence of annotations and can also be applied to unlabeled data. Consequently, for example, a significantly larger data volume can be used to train the object detector for the second sensor, which further positively affects the object detection quality or the quality of the object detector.

Overall, FIG. 1 thus shows an improved method for training an object detector for a sensor 1.

In particular, FIG. 1 shows a method 1 which uses a sensor model, the sensor model describing the measurement characteristic of a target sensor and supporting the transfer of existing annotations of a data record.

The sensor model is, in particular, designed in such a way, based on the object representation provided, for example a decision of the object detector for the first sensor data or a provided annotation, so as to determine a measured value to be expected for the sensor. In this case, the sensor model may be designed, for example, to provide a probability density over the expected positions of the measured values of the sensor. The probability density can be described, for example, by means of a parametric density function, for example a multivariate Gaussian distribution, and does not have to be limited to the expected positions of the measured values. Rather, the density function may also comprise further dimensions, for example with respect to a radial velocity in the case of a radar sensor.

Furthermore, however, the sensor model may also be described, for example, by means of discrete approximations, for example grid representations, or may be designed to determine specific values for the corresponding measured values of the sensor, it being possible for the sensor model to have, for example, a list of expected reflections in the case of a radar sensor or a 3D point cloud in the case of a lidar sensor.

As further shown in FIG. 1, the step 7 of training the object detector on the basis of the second sensor data has a step 8 of comparing the second sensor data with the first sensor data in order to determine a first cost function or a first loss, and a step 9 of training the object detector on the basis of the first cost function.

According to the first embodiment, the sensor model is differentiable, the sensor model, on the basis of the object representations provided, comparing expected sensor values with the actual conditions or values based on the sensor model. Errors in object detection by the object detector lead to expected sensor values which differ from the actual values. A first cost function calculated based on this difference can then be transmitted to the output of the object detector and used to retrain the object detector.

If the sensor model is an artificial neural network, the corresponding loss functions may be, for example, the negative log-likelihood of the real sensor measured values. If, on the other hand, the sensor model predicts specific sensor measured values, distances, for example the Euclidean distance or the Mahalanobis distance, can be used as the loss between the predicted and actual sensor measured values.

According to the first embodiment, the object representation is further an object detection result generated by the object detector on the basis of the first sensor data, the method 1 additionally comprising a step 10 of providing annotations, a step 11 of comparing the object detection result with the annotations provided in order to determine a second loss or a second cost function, and a step 12 of retraining the object detector on the basis of the second cost function.

For the training of the object detector, the outputs of the object detector are therefore compared with available annotations. On the basis of this comparison, a second cost function is then determined, which is used to retrain the object detector and, for example, propagates back through network layers of the object detector and can be used to adapt the corresponding network weights.

According to the first embodiment, the sensor model is also an artificial neural network. The sensor model can be trained simultaneously with the object detector. Furthermore, however, the sensor model can also be pretrained, for example.

The object detector for the first sensor can then be used, for example, to control a driver assistance system of a motor vehicle, for example an autonomously driving motor vehicle.

Furthermore, the trained sensor model can also be used independently of the object detector for other applications, for example to track objects or simulate sensor data.

Figure 2:
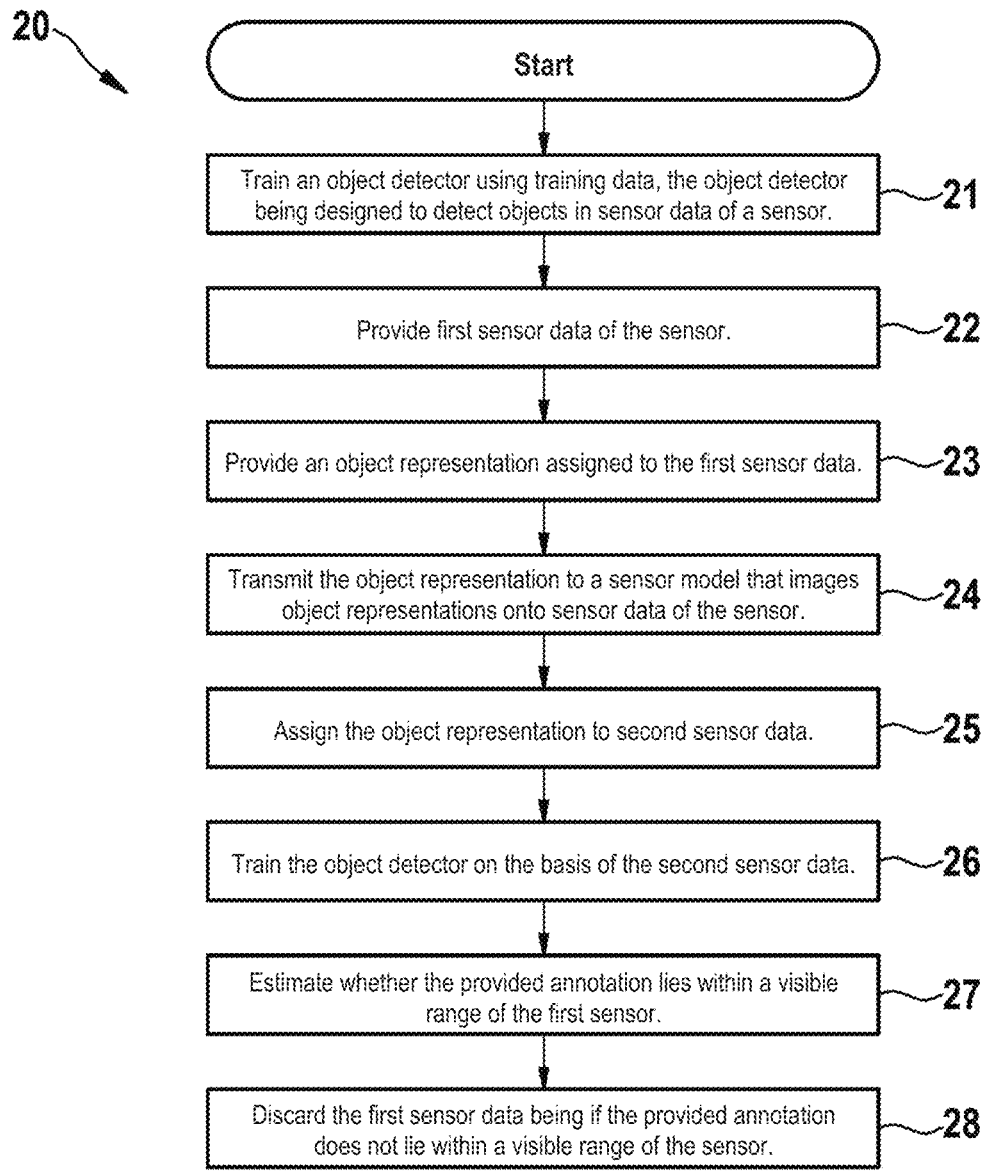
FIG. 2 is a flowchart of a method for training an object detector according to a second embodiment.

FIG. 2 is a flowchart of a method for training an object detector 20 according to a second embodiment.

As FIG. 2 shows, the method 20 comprises a step 21 of training an object detector using training data, the object detector being designed to detect objects in sensor data of a sensor, a step 22 of providing first sensor data of the sensor, a step 23 of providing an object representation assigned to the first sensor data, a step 24 of transmitting the object representation to a sensor model which is designed to image object representations onto sensor data of the sensor, a step 25 of assigning the object representation to second sensor data, and a step 26 of training the object detector on the basis of the second sensor data.

The difference between the method shown in FIG. 2 according to the second embodiment and the method shown in FIG. 1 according to the first embodiment consists in that, according to the second embodiment, the object presentation is a provided annotation, the method also comprising a step 27 of estimating whether the provided annotation lies within a visible range of the first sensor, the first sensor data being discarded in a step 28 if the provided annotation does not lie within a visible range of the sensor.

Figure 3:
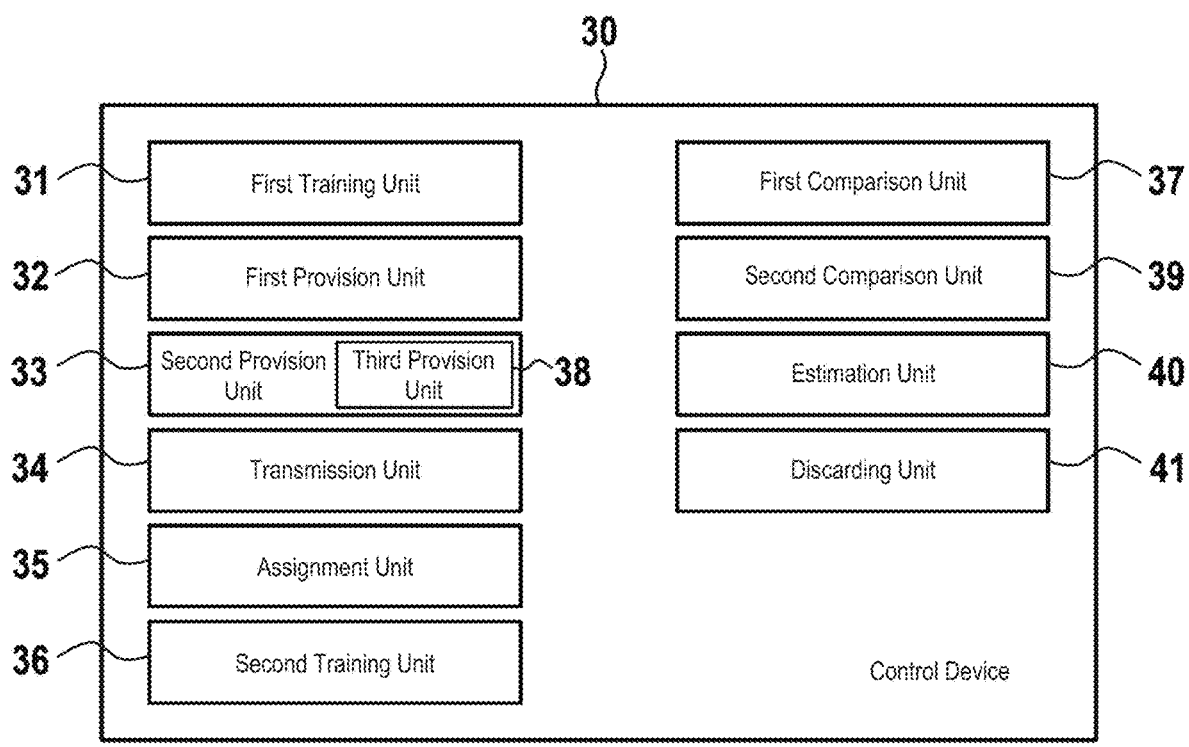
FIG. 3 is a block diagram of a system for training an object detector according to embodiments of the disclosure.

FIG. 3 is a block diagram of a control device for training an object detector 30 according to embodiments of the disclosure.

The object detector is, in particular, designed to detect objects in sensor data of a sensor.

As FIG. 3 shows, the control device for training an object detector in this case comprises a first training unit 31, which is designed to pretrain the object detector on the basis of training data, a first provision unit 32, which is designed to provide first sensor data of the sensor, a second provision unit 33, which is designed to provide an object representation assigned to the first sensor data, a transmission unit 34, which is designed to transmit the object representation to a sensor model which is designed to image object representations onto sensor data of the sensor, an assignment unit 35, which is designed to assign the object representation to second sensor data by means of the sensor model, and a second training unit 36, which is designed to train the object detector on the basis of the second sensor data.

The first training unit, the assignment unit, and the second training unit can in each case be implemented, for example, on the basis of code stored in a memory and executable by a processor. The first provision unit can be implemented, for example, on the basis of a receiver which is designed to receive sensor data from the sensor, for example sensor data that are currently being recorded and/or stored in a memory. The second provision unit can be implemented, for example, on the basis of a receiver which is designed to receive an object detection result generated by the object detector on the basis of the first sensor data and/or annotations provided, for example, by other sensors. The transmission unit may also be, for example, a correspondingly designed transmitter.

According to the embodiments of FIG. 3, the control device 30 further comprises a first comparison unit 37, which is designed to compare the second sensor data with the first sensor data in order to determine a first cost function, the second training unit 36 being designed to train the object detector on the basis of the first cost function.

The comparison unit can in turn be implemented, for example, on the basis of code stored in a memory and executable by a processor.

A third provision unit 38, which is designed to provide annotations, can also be seen.

In this case, the control device 30 also comprises a second comparison unit 39, which is designed to compare the object representation with the provided annotations if the object representation is generated by means of the object detector on the basis of the first sensor data in order to determine a second cost function, the retraining unit 36 being designed to train the object detector on the basis of the second cost function.

The third provision unit 38 may be integrated into the second provision unit and have a corresponding receiver. The second comparison unit can again be implemented, for example, on the basis of code stored in a memory and executable by a processor.

The control device 30 shown also has an estimation unit 40, which is designed to estimate whether an annotation provided as an object representation lies within a visible range of the sensor, and a discarding unit 41, which is designed to discard the first sensor data or the corresponding object representation if the annotation does not lie within the visible range of the sensor.

The estimation unit and the discarding unit can again be implemented, for example, on the basis of code stored in a memory and executable by a processor.

According to the embodiments of FIG. 3, the sensor model is again an artificial neural network.

What is claimed is:

1. A method for training an object detector model configured to detect objects in sensor data of a first sensor, the method comprising:
   providing first sensor data of the first sensor;
   providing an object representation assigned to the first sensor data, the object representation including an object detection result generated by the object detector model based on the first sensor data;
   transmitting the object representation to a sensor model, the sensor model describing measurement characteristics of the first sensor;
   determining second sensor data including values to be expected to be measured by for the first sensor by imaging the object representation onto the first sensor data of the first sensor with the sensor model;
   assigning the object representation to the second sensor data with the sensor model; and
   training the object detector model based on the second sensor data, the object detector model being a neural network having a plurality of network weights that are adapted during the training, the training the object detector model including (i) providing annotations, (ii) comparing the object detection result with the annotations in order to determine a cost function, and (iii) adapting the plurality of network weights based on the cost function.

2. The method according to claim 1, wherein training the object detector model further comprises:
   comparing the second sensor data with the first sensor data in order to determine another cost function; and
   adapting the plurality of network weights based on the other cost function.

3. The method according to claim 1, wherein the annotations are generated using a second sensor.

4. The method according to claim 1, wherein the sensor model is an artificial neural network.

5. A method for controlling a driver assistance system of a motor vehicle, comprising:
   training an object detector model configured to detect objects in sensor data of a first sensor of the motor vehicle, the object detector model being a neural network having a plurality of network weights that are adapted during the training, the training including:
   providing first sensor data of the first sensor,
   providing an object representation assigned to the first sensor data, the object representation including an object detection result generated by the object detector model based on the first sensor data, transmitting the object representation to a sensor model, the sensor model describing measurement characteristics of the first sensor, determining second sensor data including values to be expected to be measured by the first sensor by imaging the object representation onto the first sensor data of the first sensor with the sensor model, assigning the object representation to the second sensor data with the sensor model, and training the object detector model based on the second sensor data, the training the object detector model including (i) providing annotations, (ii) comparing the object detection result with the annotations in order to determine a cost function, and (iii) adapting the plurality of network weights based on the cost function;

providing the trained object detector model for the first sensor of the motor vehicle;

generating object detection results using the trained object detector model; and controlling the driver assistance system based on the object detection results.

6. A control device for training an object detector model for detecting objects in sensor data of a first sensor, the control device comprising:

a first receiver configured to provide first sensor data of the first sensor;

a second receiver configured to provide an object representation assigned to the first sensor data, the object representation including an object detection result generated by the object detector model based on the first sensor data;

a transmitter configured to transmit the object representation to a sensor model configured to determine second sensor data including values to be expected to be measured by the first sensor by imaging the object representation onto the first sensor data of the first sensor, the sensor model describing measurement characteristics of the first sensor; and a processor configured to (i) assign the object representation to the second sensor data using the sensor model and (ii) train the object detector model based on the second sensor data, the object detector model being a neural network having a plurality of network weights that are adapted during the training, the training the object detector model including providing annotations, comparing the object detection result with the annotations in order to determine a cost function, and adapting the plurality of network weights based on the cost function.

7. The control device according to claim 6, the processor further configured to:

compare the second sensor data with the first sensor data in order to determine another cost function; and adapt the plurality of network weights based on the other cost function.

8. The control device according to claim 6, wherein the object representation is an annotation.

9. The control device according to claim 6, wherein the sensor model is an artificial neural network.

10. The control device according to claim 6, wherein a driver assistance system of a motor vehicle including the first sensor is controlled by (i) receiving the object detector model for the first sensor of the motor vehicle, (ii) generating object detection results using the object detector model, and (iii) controlling the driver assistance system based on the generated object detection results.

* * * * *